(12) United States Patent
Wada et al.

(10) Patent No.: US 8,866,036 B2
(45) Date of Patent: Oct. 21, 2014

(54) WELDING TORCH AND ADAPTER KIT

(75) Inventors: Katsunori Wada, Kai (JP); Hiroki Oono, Kai (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 0 days.

(21) Appl. No.: 13/640,829

(22) PCT Filed: Feb. 15, 2012

(86) PCT No.: PCT/JP2012/053500
§ 371 (c)(1),
(2), (4) Date: Nov. 26, 2012

(87) PCT Pub. No.: WO2012/111695
PCT Pub. Date: Aug. 23, 2012

(65) Prior Publication Data
US 2013/0193117 A1   Aug. 1, 2013

(30) Foreign Application Priority Data
Feb. 15, 2011   (JP) ................. 2011-029724

(51) Int. Cl.
*B23K 9/167*   (2006.01)
*B23K 9/32*   (2006.01)
*B23K 9/29*   (2006.01)

(52) U.S. Cl.
CPC ............. *B23K 9/167* (2013.01); *B23K 9/325* (2013.01); *B23K 9/291* (2013.01)
USPC .......................................................... 219/75

(58) Field of Classification Search
USPC .................... 219/70, 74, 75, 137.42
See application file for complete search history.

(56) References Cited

U.S. PATENT DOCUMENTS 3,238,349 A * 3/1966 Anderson et al. ............... 219/75
3,739,140 A * 6/1973 Rotilio .......................... 219/144
4,142,086 A * 2/1979 Rotilio ............................ 219/75
(Continued)

FOREIGN PATENT DOCUMENTS

CN   1701890 A   11/2005
CN   101041202 A   9/2007
(Continued)

OTHER PUBLICATIONS

International Search Report Issued in PCT/JP2012/053500 on May 22, 2012.
(Continued)

*Primary Examiner* — Dana Ross
*Assistant Examiner* — John J Norton
(74) *Attorney, Agent, or Firm* — Nixon & Vanderhye P.C.

(57) ABSTRACT

According to the present invention, an adapter kit is provided in which a welding torch having a single nozzle structure is switched to a welding torch having a double nozzle structure. In an adapter kit (20A) which is installed in a switchable manner in a welding torch (1A) having a single nozzle structure, the present invention includes an attachment (7A) which is mounted to the torch body (5) in a state where the torch nozzle (inner nozzle) (6A) is inserted into the attachment after the gasket is removed and in which a flow channel that supplies a second shielding gas is provided, and an outer nozzle (8A) that is mounted to the attachment (7A) surrounding the periphery of the torch nozzle (6A) and discharges a second shielding gas.

11 Claims, 13 Drawing Sheets

(56) References Cited

U.S. PATENT DOCUMENTS

| | | | |
|---|---|---|---|
| 4,145,595 A * | 3/1979 | Keller et al. | 219/75 |
| 5,258,599 A * | 11/1993 | Moerke | 219/121.48 |
| 6,392,184 B1 * | 5/2002 | Yokota et al. | 219/74 |
| 6,852,950 B2 * | 2/2005 | Giese | 219/137.42 |
| 6,995,331 B2 * | 2/2006 | Samler | 219/75 |
| 7,105,766 B2 * | 9/2006 | Samler | 219/75 |
| 7,576,300 B2 * | 8/2009 | Giese | 219/137.61 |
| 2007/0284353 A1 * | 12/2007 | Laymon | 219/137.31 |

FOREIGN PATENT DOCUMENTS

| | | | |
|---|---|---|---|
| FR | 2696668 A1 * | 4/1994 | |
| JP | 50-140929 | 11/1975 | |
| JP | 51-050838 | 5/1976 | |
| JP | 57-085678 | 5/1982 | |
| JP | 57085678 A * | 5/1982 | |
| JP | 02-053882 | 4/1990 | |
| JP | 02053882 U * | 4/1990 | |
| JP | 07-132377 | 5/1995 | |
| JP | 09-201678 | 8/1997 | |
| JP | 10-099968 | 4/1998 | |
| JP | 10-225771 | 8/1998 | |
| JP | 2000-312972 | 11/2000 | |
| JP | 2004-298963 | 10/2004 | |
| JP | 2010-115669 | 5/2010 | |

OTHER PUBLICATIONS

Office Action issued in Chinese Patent Application No. 201280001260.X on May 31, 2013 submitted with partial English Language Translation of thereof.

* cited by examiner

WELDING TORCH AND ADAPTER KIT

CROSS-REFERENCE TO RELATED APPLICATIONS

This Application is a national phase of International Application No. PCT/JP2012/053500, filed Feb. 15, 2012, which claims priority to Japanese Patent Application No. 2011-029724, filed Feb. 15, 2011, the contents of all of which are incorporated herein by reference.

TECHNICAL FIELD

The present invention relates to a welding torch and an adapter kit.

BACKGROUND ART

In the related art, when welding of a structure (a material to be welded) that uses a metal, a nonferrous metal, or the like as a base material, non-consumable electrode type gas shielded arc welding referred to as GTAW (Gas Tungsten Arc welding) such as TIG welding (Tungsten Inert Gas welding) or plasma arc welding, consumable electrode type gas shielded arc welding (also referred to as semi-automatic arc welding) referred to as GMAW (Gas Metal Arc welding) such as MIG welding (Metal Inert Gas welding), MAG welding (Metal Active Gas welding), or $CO_2$ gas shielded arc welding have been used.

In these welding methods, in general, a welding torch having a single nozzle structure is used, an arc is generated between an electrode and a material to be melted, and welding is performed. Moreover, an inert gas (shielding gas) such as argon or helium is discharged from a nozzle that surrounds the periphery of the electrode during welding, and welding is performed while being shielded from the atmosphere (air) using the shielding gas.

In addition, in TIG welding, in order to make a deep weld penetration in the welded portion, mixed gas in which hydrogen is added to argon or mixed gas in which helium is added to argon is used as the shielding gas. In addition, for example, in TIG welding of an austenitic stainless steel, a welding torch having a double nozzle structure is used in which an inert gas flows to the inside and oxidized gas flows to the outside, and thereby, welding is performed so that the weld penetration depth is deeper (refer to Patent Document 1).

On the other hand, also in MIG welding, a welding torch having a double nozzle structure is used in which a primary shielding gas flows to the inside and a secondary shielding gas flows to the outside (refer to Patent Document 2).

Here, a TIG welding torch 100A of the related art having a single nozzle structure shown in FIGS. 11A and 11B will be described. Moreover, FIG. 11A is a main portion cross-sectional view of the TIG welding torch 100A having a single nozzle structure and FIG. 11B is an assembly diagram of the TIG welding torch 100A having a single nozzle structure.

As shown in FIGS. 11A and 11B, the TIG welding torch 100A generally includes a non-consumable electrode 101 that generates an arc between the electrode and a material to be welded, a collet 102 that supports the non-consumable electrode 101 in a state where the electrode is inserted into the collet, a collet body 103A that holds the collet 102 inside the collet body in a state where the non-consumable electrode 101 protrudes from the tip side of the collet body, a torch body 104 to which the collet body 103A is mounted, a torch nozzle 105A that is mounted to the collet body 103A surrounding the periphery of the non-consumable electrode 101 and discharges shielding gas, a front gasket 106 that is disposed between the torch body 104 and the torch nozzle 105A, a torch cap 108 that is mounted in a state where a rear gasket 107 is disposed between the torch body 104 and the torch cap, and a handle 109 that is mounted to the torch body 104.

In addition, in the TIG welding torch 100A, after a welding cable C is connected, an arc is generated between the non-consumable electrode 101 and the material to be welded while the shielding gas is discharged from the torch nozzle 105A, and welding is performed.

Next, a TIG welding torch 100B of the related art having a single nozzle structure shown in FIGS. 12A and 12B will be described. Moreover, FIG. 12A is a main portion cross-sectional view of the TIG welding torch 100B having a single nozzle structure and FIG. 12B is an assembly diagram of the TIG welding torch 100B having a single nozzle structure.

As shown in FIGS. 12A and 12B, the TIG welding torch 100B includes a gas lens type collet body 103B instead of the collet body 103A. The collet body 103B is configured so as to be integrally formed with a gas lens 110 that corrects the flow of the shielding gas discharged from a torch nozzle 105B. In addition, in accordance with the increase in the diameter of the collet body 103B, the diameter of the torch nozzle 105B is increased to a greater extent than that of the torch nozzle 105A. Apart from that, the TIG welding torch 100B generally has the same configuration as that of the TIG welding torch 100A. Therefore, apart from this difference, descriptions of the same portions as the TIG welding torch 100A are omitted and the same reference numerals are given to the same portions in the drawings.

In the TIG welding torch 100B, after the welding cable C is connected, an arc is generated between the non-consumable electrode 101 and the material to be welded while the flow of the shielding gas corrected by the gas lens 110 is discharged from the torch nozzle 105B, and welding is performed. In the gas lens type TIG welding torch 100B, the flow of the shielding gas that is discharged from the torch nozzle 105B is corrected by the gas lens 110, and thereby, the shielding effect from the atmosphere (air) due to the shielding gas may be enhanced.

Next, a TIG welding torch 100C of the related art having a double nozzle structure shown in FIG. 13 will be described. Moreover, FIG. 13 is an assembly diagram in which a main portion of the TIG welding torch 100C having the double nozzle structure is shown in a cross-section.

As shown in FIG. 13, instead of the torch nozzle 105A, the TIG welding torch 100C includes an inner nozzle 105a that is mounted to a collet body 103C surrounding the periphery of the non-consumable electrode 101 and discharges a first shielding gas, and an outer nozzle 105b that is mounted to the inner nozzle 105a surrounding the periphery of the inner nozzle 105a and discharges a second shielding gas. Apart from that, the TIG welding torch 100C generally has the same configuration as that of the TIG welding torch 100A. Therefore, apart from this difference, descriptions of the same portions as the TIG welding torch 100A are omitted and the same reference numerals are given to the same portions in the drawings.

In the TIG welding torch 100C, after the welding cable C is connected, an arc is generated between the non-consumable electrode 101 and the material to be welded while the first shielding gas is discharged from the inner nozzle 105a and the second shielding gas is discharged from the outer nozzle 105b, and welding is performed. In the TIG welding torch 100C having the double nozzle structure, there are two types of shielding gas, and thereby, the weld penetration depth can be deeper.

Next, an MIG welding torch 200 of the related art having a single nozzle structure shown in FIG. 14 will be described. Moreover, FIG. 14 is an assembly diagram in which a main portion of the MIG welding torch 200 having the single nozzle structure is shown in a cross-section.

As shown in FIG. 14, the MIG welding torch 200 generally includes a consumable electrode 201 that generates an arc toward a material to be welded, a contact tip 202 that guides and concurrently sends out the consumable electrode 201 from the tip side of the contact tip, a torch body 203 to which the contact tip 202 is mounted, a torch nozzle 204 that is mounted to the torch body 203 surrounding the periphery of the contact tip 202 and discharges shielding gas, and a handle 205 that is mounted to the torch body 203.

In addition, in the MIG welding torch 200, after a welding cable D is connected, an arc is generated between the consumable electrode 201 and the material to be welded while the shielding gas is discharged from the torch nozzle 204, and welding is performed. Moreover, in the MIG welding torch 200, since the consumable electrode 201 itself is welded while being melted by the arc, a structure is configured in which the consumable electrode 201 is automatically fed through the inside of the handle 205.

CITATION LIST

Patent Document

[Patent Document 1] Japanese Unexamined Patent Application, First Publication No. 2004-298963
[Patent Document 2] Japanese Unexamined Patent Application, First Publication No. S51-50838

SUMMARY OF INVENTION

Technical Problem

Incidentally, since it is not possible to switch the double nozzle structure with the single nozzle structure or the single nozzle structure with the double nozzle structure in the above-described TIG welding torches 100A and 100B of the related art having the single nozzle structure and the TIG welding torch 100C of the related art having the double nozzle structure, each one must be prepared separately, which is particularly inconvenient as the purchase costs are increased. Moreover, there is also a similar inconvenience in the above-described MIG welding torch 200.

The invention is proposed in consideration of the above-described circumstances of the related art, and an object thereof is to provide, at a low cost, a welding torch capable of easily switching from a double nozzle structure to a single nozzle structure and an adapter kit capable of easily switching from a welding torch having a single nozzle structure to a welding torch having a double nozzle structure.

Solution to Problem

In order to achieve the object, a welding torch according to the present invention includes: a non-consumable electrode that generates an arc toward a material to be welded; a collet that supports the non-consumable electrode which is being inserted into the inside of the collet; a collet body that internally holds the collet in a state where the non-consumable electrode protrudes from the tip side of the collet body; a torch body that mounts the collet body and includes a power supply portion that supplies electric power to the non-consumable electrode via the collet body and the collet, and a flow channel that supplies a first shielding gas; an inner nozzle that is mounted to the collet body surrounding the periphery of the non-consumable electrode and discharges the first shielding gas; an attachment that is mounted to the torch body in a state where the inner nozzle is inserted into the inside of the attachment, and includes a flow channel that supplies a second shielding gas; and an outer nozzle that is mounted to the attachment surrounding the periphery of the inner nozzle and discharges the second shielding gas.

In the welding torch that includes the above-described configuration, the inner nozzle is mounted to the collet body in a state where a gasket is disposed between the inner nozzle and the torch body after the attachment and the outer nozzle are removed, and thereby, a double nozzle structure is switched to a single nozzle structure.

In addition, a welding torch according to the present invention includes: a consumable electrode that generates an arc toward a material to be welded; a contact tip that guides and concurrently sends out the consumable electrode from the tip side of the contact tip; a torch body that includes a power supply portion which mounts the contact tip and supplies electric power to the consumable electrode via the contact tip, a supply path that feeds the consumable electrode to the contact tip, and a flow channel that supplies a first shielding gas; an inner nozzle that is mounted to the torch body surrounding the periphery of the contact tip and discharges the first shielding gas; an attachment that is mounted to the torch body in a state where the inner nozzle is inserted into the inside of the attachment and a spacer is disposed between the attachment and the inner nozzle, and includes a flow channel that supplies a second shielding gas; and an outer nozzle that is mounted to the attachment surrounding the periphery of the inner nozzle and discharges the second shielding gas.

In the welding torch that includes the above-described configuration, the inner nozzle is mounted to the collet body in a state where the gasket is disposed between the inner nozzle and the torch body after the attachment, the outer nozzle, and the spacer are removed, and thereby, a double nozzle structure is switched to a single nozzle structure.

In addition, an adapter kit according to the present invention which is installed in a switchable manner in a welding torch that includes: a non-consumable electrode that generates an arc toward a material to be welded; a collet that supports the non-consumable electrode which is being inserted into the inside of the collet; a collet body that internally holds the collet in a state where the non-consumable electrode protrudes from the tip side of the collet body; a torch body that mounts the collet body and includes a power supply portion that supplies electric power to the non-consumable electrode via the collet body and the collet, and a flow channel that supplies a first shielding gas; a torch nozzle that is mounted to the collet body surrounding the periphery of the non-consumable electrode and discharges the first shielding gas; and a gasket that is disposed between the torch body and the torch nozzle, wherein the adapter kit includes: an attachment that is mounted to the torch body in a state where the torch nozzle is inserted into the inside of the attachment after the gasket is removed, and includes a flow channel that supplies a second shielding gas; and an outer nozzle that is mounted to the attachment surrounding the periphery of the torch nozzle and discharges the second shielding gas.

In the welding torch in which the adapter kit that includes the above-described configuration is installed in a switchable manner, a single nozzle structure is switched to a double nozzle structure.

Moreover, an adapter kit according to the present invention which is installed in a switchable manner in a welding torch that includes: a consumable electrode that generates an arc toward a material to be welded; a contact tip that guides and concurrently sends out the consumable electrode from the tip side of the contact tip; a torch body that includes a power supply portion which mounts the contact tip and supplies electric power to the consumable electrode via the contact tip, a supply path that feeds the consumable electrode to the contact tip, and a flow channel that supplies a first shielding gas; and a torch nozzle that is mounted to the torch body surrounding the periphery of the contact tip and discharges the first shielding gas, wherein the adapter kit further includes: an attachment that is mounted to the torch body in a state where the inner nozzle is inserted into the inside of the attachment and a spacer is disposed between the attachment and the inner nozzle, and includes a flow channel that supplies a second shielding gas; and an outer nozzle that is mounted to the attachment surrounding the periphery of the torch nozzle and discharges the second shielding gas.

In the welding torch in which the adapter kit that includes the above-described configuration is installed in a switchable manner, a single nozzle structure is switched to a double nozzle structure.

Advantageous Effects of Invention

As described above, according to the present invention, it is possible to provide, at a low cost, the welding torch in which the double nozzle structure can be easily switched to the single nozzle structure and the adapter kit in which the welding torch having the single nozzle structure can be easily switched to the welding torch having the double nozzle structure. Moreover, the adapter kit can be used in both a non-consumable electrode type welding torch and a consumable electrode type welding torch.

DESCRIPTION OF EMBODIMENTS

Hereinafter, a welding torch and an adapter kit to which the present invention is applied will be described in detail with reference to the drawings.

First Embodiment

Figure 1:
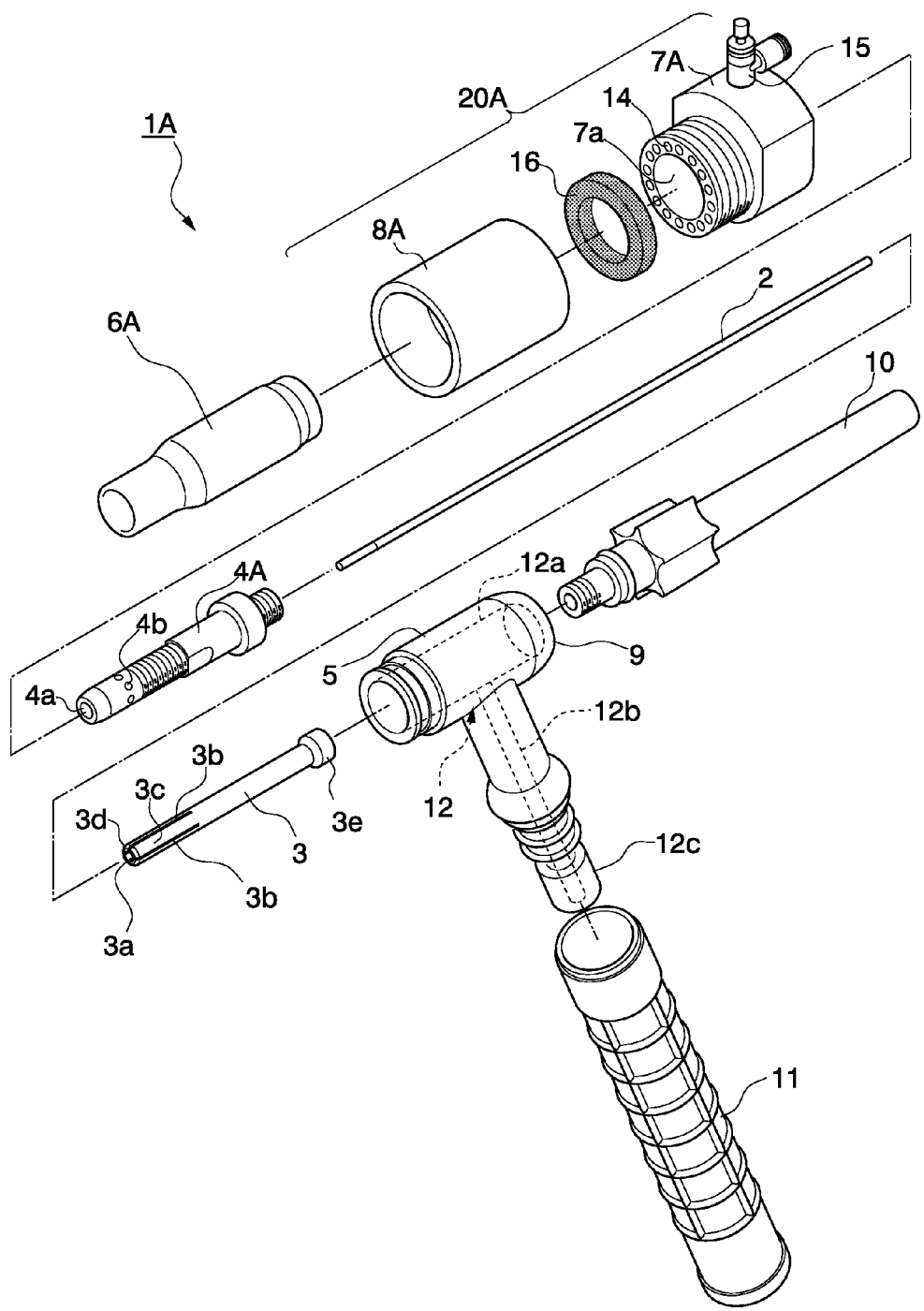
FIG. 1 is an exploded perspective view showing an example of a TIG welding torch in which an adapter kit of the present invention is installed in a switchable manner.
Figure 2A:
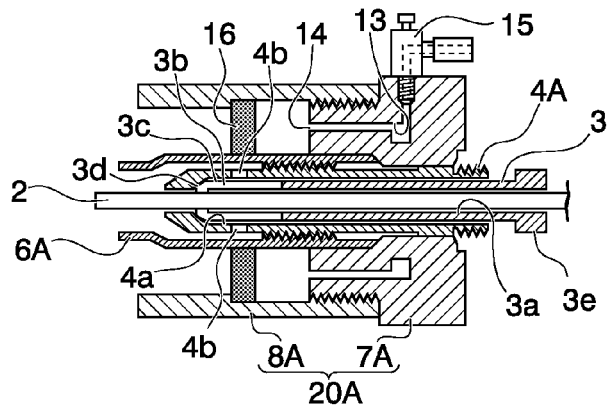
FIG. 2A is a main portion cross-sectional view of the TIG welding torch in which the adapter kit shown in FIG. 1 is installed in a switchable manner.
Figure 2B:
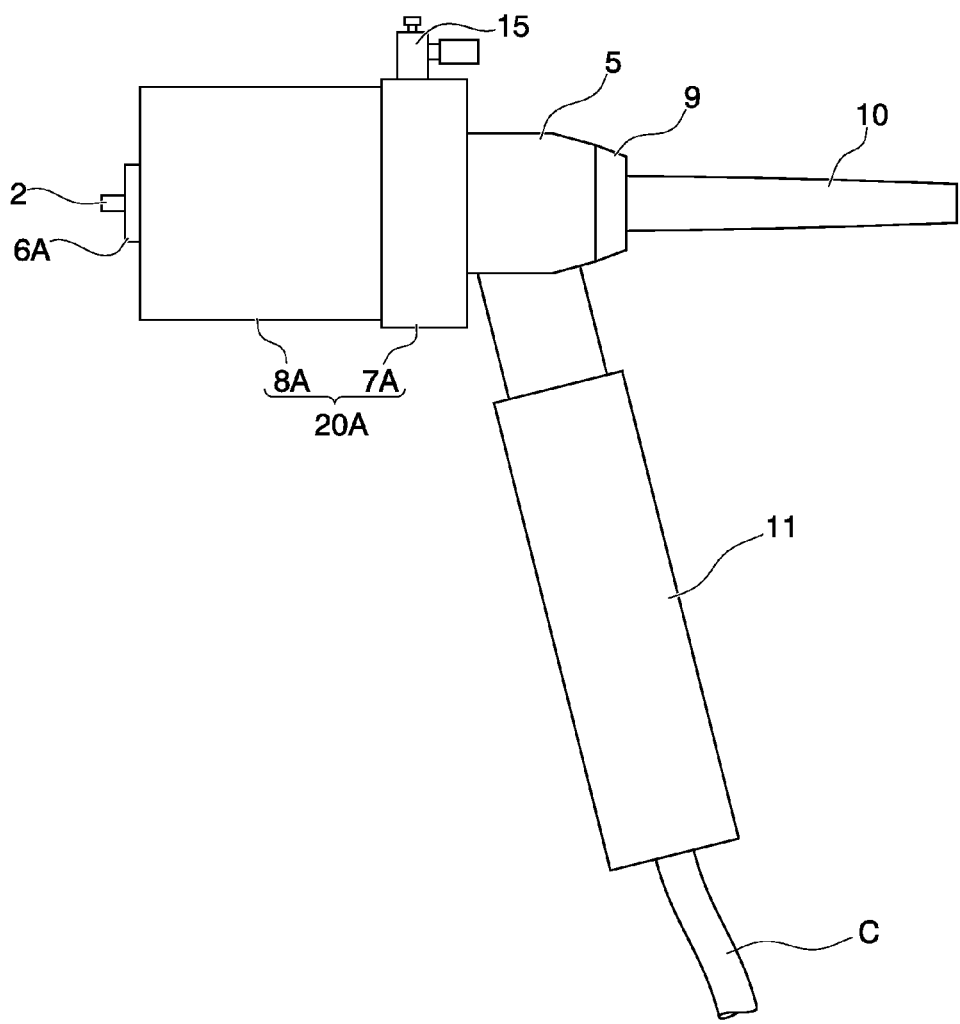
FIG. 2B is an assembly diagram of the TIG welding torch in which the adapter kit shown in FIG. 1 is installed in a switchable manner.

First, as a first embodiment, a TIG welding torch 1A in which an adapter kit 20A of the present invention shown in FIGS. 1, 2A, and 2B is installed in a switchable manner will be described.

In addition, FIG. 1 is an exploded perspective view showing a configuration of the TIG welding torch 1A, FIG. 2A is a main portion cross-sectional view of the TIG welding torch 1A, and FIG. 2B is an assembly diagram of the TIG welding torch 1A.

The TIG welding torch 1A is a TIG welding torch in which a double nozzle structure can be switched to a single nozzle structure. In other words, the TIG welding torch 1A is a TIG welding torch in which the adapter kit 20A of the present invention is installed in a switchable manner in the TIG welding torch 100A of the related art shown in FIGS. 11A and 11B and, thereby, the single nozzle structure is switched to the double nozzle structure.

Specifically, as shown in FIGS. 1, 2A, and 2B, the TIG welding torch 1A generally includes a non-consumable electrode 2 that generates an arc toward a material to be welded, a collet 3 that supports the non-consumable electrode 2 in a state where the electrode is inserted into the inside of the collet, a collet body 4A that internally holds the collet 3 in a state where the non-consumable electrode 2 protrudes from the tip side of the collet body, a torch body 5 that mounts the collet body 4A, an inner nozzle 6A that is mounted to the collet body 4A surrounding the periphery of the non-consumable electrode 2 and discharges a first shielding gas, an attachment 7A that is mounted to the torch body 5 in a state where the inner nozzle 6A is inserted into the inside of the attachment, an outer nozzle 8A that is mounted to the attachment 7A surrounding the periphery of the inner nozzle 6A and discharges a second shielding gas, a torch cap 10 that is mounted in a state where a rear gasket 9 is disposed between the torch body 5 and the torch cap, and a handle 11 that is mounted to the torch body 5.

For example, the non-consumable electrode 2 is configured of a long electrode bar that is formed using a metal material having a high melting point such as tungsten.

For example, the collet 3 is configured of a substantially cylindrical member that is formed using a metal material having improved electrical conductivity and thermal conductivity such as copper or copper alloy. The collet 3 includes a through-hole 3a that penetrates in an axis line direction and slidably supports a non-consumable electrode 2 inserted into the inside of the through-hole 3a. In addition, a plurality of slits 3b are provided on the tip side of the collet 3 so as to be arranged in the circumferential direction. The plurality of slits 3b are cut out in a linear shape from the tip of the collet 3 to a middle portion in the axis line direction. Thereby, the tip portion 3c between each slit 3b can be elastically deformed in a radial direction. Moreover, a taper portion 3d which gradually decreases in diameter is provided on the tip portion of the collet 3. On the other hand, a diameter-increased portion 3e having a larger diameter than the periphery is provided at a base end of the collet 3.

The collet body 4A is configured of a substantially cylindrical member that is formed using a material having improved electrical conductivity and thermal conductivity such as copper or copper alloy. The collet body 4A includes a through-hole 4a that penetrates in the axis line direction and holds the collet 3, which is inserted from the based end side of the through-hole 4a, in the inside. In addition, a flow channel in which a first shielding gas supplied from the torch body 5 flows is formed in the through-hole 4a of the collet body 4A. In addition, the diameter of the tip portion of the collet body 4A is gradually decreased along with the through-hole 4a, and only the non-consumable electrode 2 can protrude from the tip portion of the through-hole 4a. Moreover, a plurality of ejection holes 4b that eject the first shielding gas are provided on the tip side of the collet body 4A so as to be arranged in the circumferential direction. Moreover, the base end side of the collet body 4A can be detachably mounted to torch body 5 through a screw.

The torch body 5 includes a main body metal fitting 12 that is formed using a conductive metal material having lower thermal conductivity than the above-described collet 3 or the collet body 4A, for example, a steel material such as mild steel or stainless steel, brass, or the like, and the main body metal fitting 12 has a structure that is coated by an insulating resin.

The main body metal fitting 12 forms a power supply portion that supplies electric power to the non-consumable electrode 2 via the collet body 4A and the collet 3, and a flow channel which supplies the first shielding gas toward the collet body 4A is formed inside the metal fitting.

The main body metal fitting 12 can be detachably mounted to the collet body 4A of one side (tip side) of a portion (hereinafter, referred to as a cylindrical portion) 12a that is formed in a substantially cylindrical shape and the torch cap 10 of the side (rear end side) opposite to the collet body through screwing respectively. Moreover, the main body metal fitting 12 includes a connection portion 12c at a tip of a portion (hereinafter, referred to as an extension portion) 12b that extends in a substantially tubular shape from the middle portion of the cylindrical portion 12a toward the lower portion, and a welding cable C is detachably connected to the connection portion 12c through screwing. A power supply cable that supplies electric power from an external power source to the main body metal fitting 12 and a hose that introduce the first shielding gas to the main body metal fitting 12 are integrated, and thereby, the welding cable C is configured.

The inner nozzle 6A performs correction of the flow of the first shielding gas that is ejected from the ejection hole 4b of the collet body 4A, prevents mixture of spatter that is scattered during welding, is formed in a substantially cylindrical shape using ceramic or the like having improved heat resistance, and has a nozzle shape in which the diameter of the tip side thereof is gradually decreased. Moreover, the inner nozzle 6A can be detachably mounted to the outer circumferential portion of the collet body 4A through screwing.

Figure 11A:
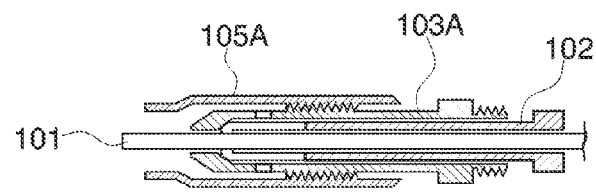
FIG. 11A is a main portion cross-sectional view showing an example of a TIG welding torch of the related art having a single nozzle structure.
Figure 11B:
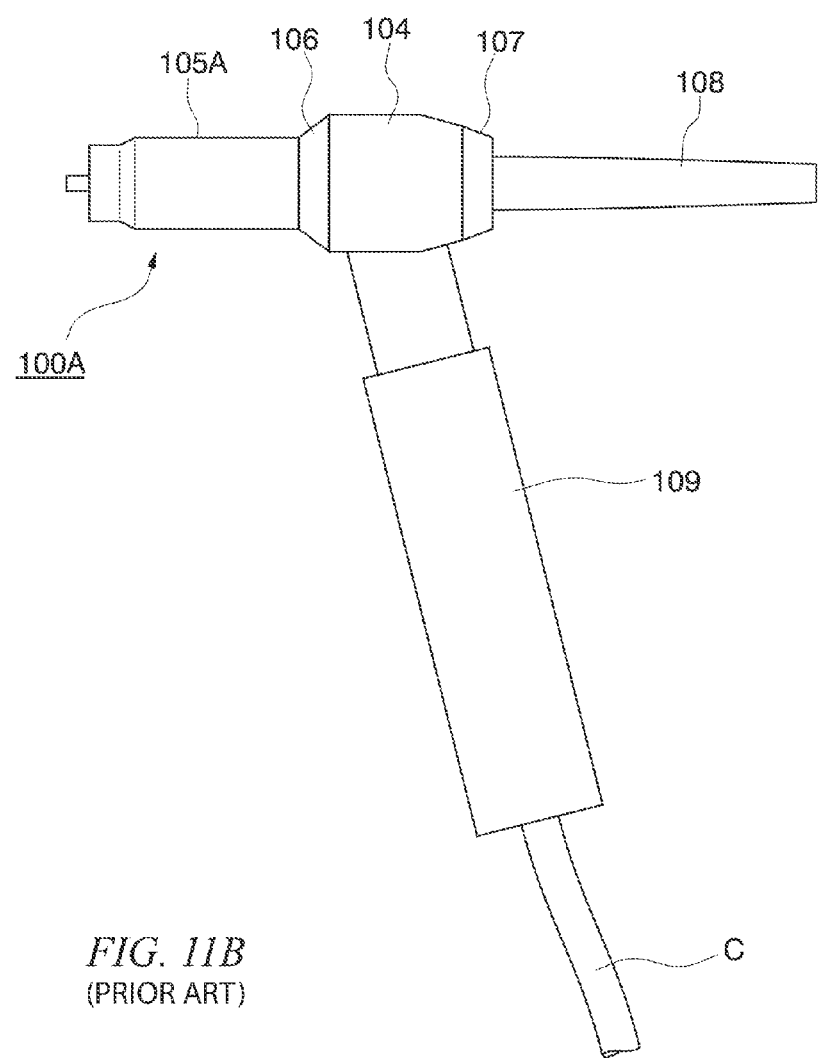
FIG. 11B is an assembly diagram of an example of the TIG welding torch of the related art having the single nozzle structure.

The attachment 7A configures the adapter kit 20A of the present invention along with the outer nozzle 8A, and is mounted in a state of being interposed between the torch body 5 and the inner nozzle 6A instead of the front gasket 106 of the TIG welding torch 100A of the related art having the single nozzle structure shown in FIGS. 11A and 11B.

For example, the attachment 7A is configured of a member that is formed in a substantially cylindrical shape using a resin material having insulating properties, a metal material, or the like. The attachment 7A includes a through-hole 7a that penetrates in the axis line direction, and the inner nozzle 6A can be mounted on the outer circumferential portion of the collet body 4A from the tip side of the through-hole 7a in a state where the collet body 4A is inserted from the base end side of the through-hole 7a.

Moreover, the attachment 7A includes a flow channel 13 that supplies a second shielding gas, a plurality of ejection holes 14 that eject the second shielding gas, and a connection portion 15 to which a hose (not shown) introducing the second shielding gas is connected. Among these, the flow channel 13 is formed in a ring shape so as to surround the periphery of the through-hole 7a in the inner portion of the attachment 7A. On the other hand, the plurality of ejection holes 14 are provided so as to be arranged at regular intervals in a position in which the periphery of the through-hole 7a of the front surface side of the attachment 7A is surrounded. Moreover, each of the ejection holes 14 extends in the axis line direction from the front surface side of the attachment 7A and communicates with the flow channel 13. On the other hand, the connection portion 15 is provided on the outer circumferential portion of the attachment 7A and communicates with the flow channel 13. Moreover, for example, a flow rate regulating type one-touch coupler is mounted on the connection portion 15 in order to easily perform the connection of the hose.

The outer nozzle 8A performs correction of the flow of the second shielding gas that is ejected from the ejection holes 14 of the attachment 7A and prevents mixture of spatter that is scattered during welding. In addition, since the outer nozzle is not much subjected to influence of heat as the inner nozzle 6A, for example, the outer nozzle is formed in a substantially cylindrical shape using a metal material or the like such as stainless steel. Moreover, the outer nozzle 8A can be detachably mounted to the outer circumferential portion of the attachment 7A through screwing.

In addition, a gas lens 16 that corrects the flow of the second shielding gas discharged from the outer nozzle 8A is disposed between the inner nozzle 6A and the outer nozzle 8A. The gas lens 16 is configured of a mesh member made of a metal, is formed in a ring shape, and is held inside the outer nozzle 8A in a state where the inner nozzle 6A is inserted into the gas lens. Moreover, the gas lens 16 is not necessarily needed and may be omitted according to circumstances.

The torch cap 10 seals the rear end side of the torch body 5 along with the rear gasket 9 and is formed in a substantially cap shape so as to receive the rear end side of the non-consumable electrode 2 in the inside. Moreover, when the torch cap 10 is mounted to the main body metal fitting 12 of the torch body 5, the torch cap presses the collet 3 toward the tip side while the tip portion of the torch cap abuts the base end of the collet 3. At this time, the tip surface (taper portion 3d) of the collet 3 that is inserted into the through-hole 4a of the collet body 4A is pressed to the tip surface of the through-hole 4a, and therefore, the tip portion 3c of the collet 3 is elastically deformed in the direction in which the diameter is decreased. Thereby, the tip portion 3c of the collet 3 interposes the non-consumable electrode 2, and the non-consumable electrode 2 can be fixed in the collet 3.

The handle 11 is a portion that is grasped by a user, is formed in a substantially pipe-like shape, and is mounted to the extension portion 12b of the torch body 5. Moreover, the welding cable C can be connected to the connection portion 12c of the torch body 5 through the inside of the handle 11.

In the TIG welding torch 1A having the above-described structure, while an inert gas such as argon or helium, for example, is discharged from the tip of the inner nozzle 6A as the first shielding gas and mixed gas in which hydrogen is added to argon or mixed gas in which helium is added to argon, for example, is discharged from the tip of the outer nozzle 8A as the flow of the second shielding gas that is corrected by the gas lens 16, an arc is generated between the non-consumable electrode 2 and the material to be welded, and thereby, welding is performed.

In the TIG welding torch 1A having the double nozzle structure, the shielding gas is doubled, and thereby, the weld penetration depth can be deeper. Moreover, in the TIG welding torch 1A, the flow of the shielding gas that is discharged from the outer nozzle 8A is corrected by the gas lens 16, and thereby, shielding effects from the atmosphere (air) due to the shielding gas can be enhanced.

In the present invention, by removing the attachment 7A and the outer nozzle 8A that configure the adapter kit 20A of the present invention, the TIG welding torch 1A having the double nozzle structure can be switched to the TIG welding torch having the single nozzle structure. That is, in the TIG welding torch 1A, after the attachment 7A and the outer nozzle 8A that configure the adapter kit 20A of the present invention are removed, the front gasket 106 shown in FIGS. 11A and 11B is disposed between the torch body 5 and the inner nozzle 6A. Thereby, in the TIG welding torch 1A, the double nozzle structure can be easily switched to the single nozzle structure.

Moreover, in the present invention, the adapter kit 20A of the present invention is installed in a switchable manner in the TIG welding torch 100A of the related art having the single nozzle structure shown in FIGS. 11A and 11B is, and thereby, the single nozzle structure can be switched to the double nozzle structure. That is, in the TIG welding torch 100A, after the front gasket 106 is removed, the attachment 7A and the outer nozzle 8A that configure the adapter kit 20A of the present invention are mounted. Thereby, in the TIG welding torch 100A, the single nozzle structure can be easily switched to the double nozzle structure.

Second Embodiment

Figure 3:
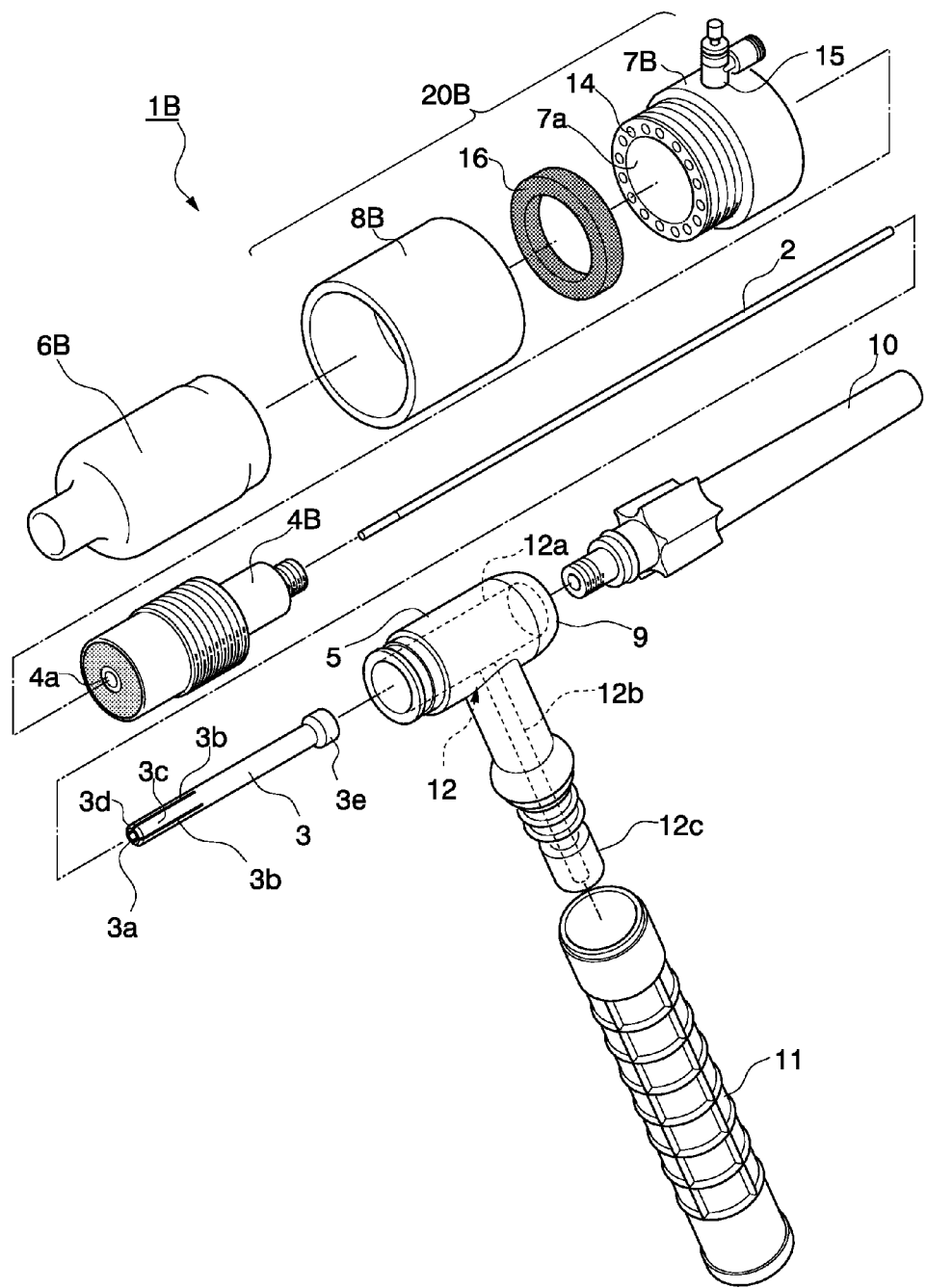
FIG. 3 is an exploded perspective view showing another example of a TIG welding torch in which the adapter kit of the present invention is installed in a switchable manner.
Figure 4A:
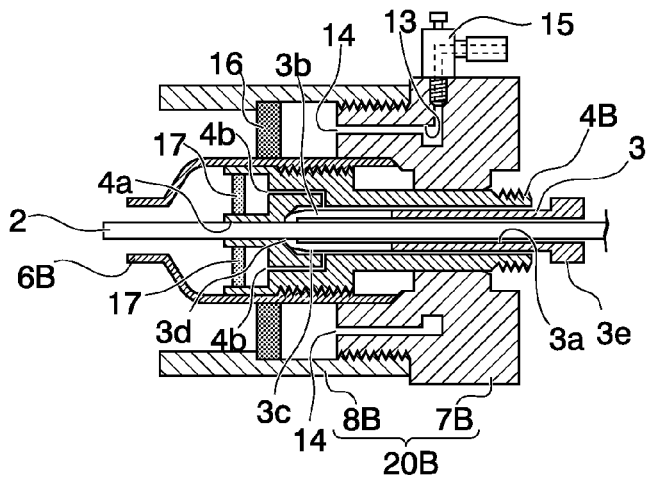
FIG. 4A is a main portion cross-sectional view of the TIG welding torch in which the adapter kit shown in FIG. 3 is installed in a switchable manner.
Figure 4B:
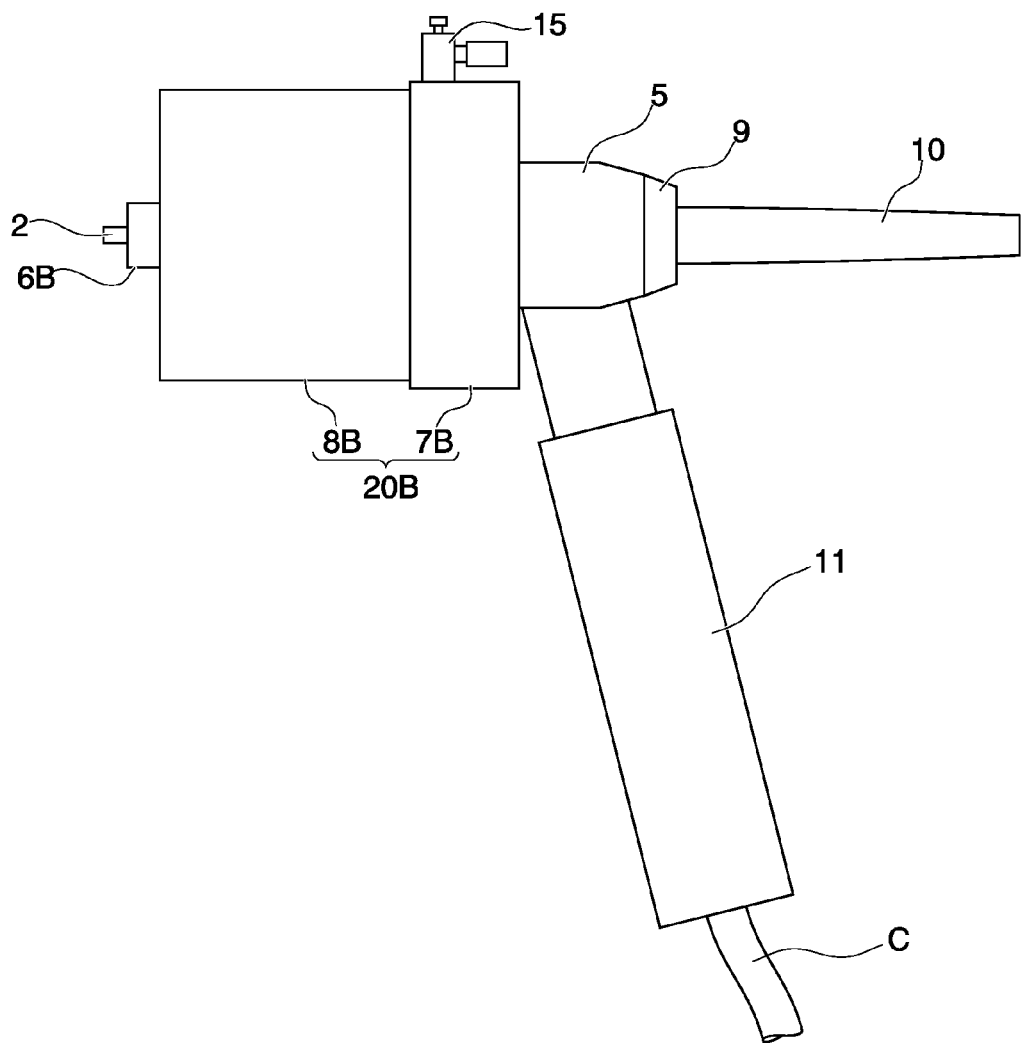
FIG. 4B is an assembly diagram of the TIG welding torch in which the adapter kit shown in FIG. 3 is installed in a switchable manner.

Next, as a second embodiment, a TIG welding torch 1B in which an adapter kit 20B of the present invention shown in FIGS. 3, 4A, and 4B is installed in a switchable manner will be described.

In addition, FIG. 3 is an exploded perspective view showing the configuration of the TIG welding torch 1B, FIG. 4A is a main portion cross-sectional view of the TIG welding torch 1B, and FIG. 4B is an assembly diagram of the welding torch 1B.

The TIG welding torch 1B is a TIG welding torch in which the double nozzle structure can be switched to the single nozzle structure. In other words, the TIG welding torch 1B is a TIG welding torch in which the adapter kit 20B of the present invention is installed in a switchable manner in the TIG welding torch 100B of the related art shown in FIGS. 12A and 12B, and thereby, the single nozzle structure is switched to the double nozzle structure.

Specifically, as shown in FIGS. 3, 4A, and 4B, the TIG welding torch 1B includes a gas lens type collet body 4B instead of the collet body 4A. The collet body 4B is configured so as to be integrally formed with a gas lens 17 that corrects the flow of the first shielding gas discharged from the inner nozzle 6B. In addition, the diameter of the inner nozzle 6B is more increased than that of the inner nozzle 6A according to the increase of the diameter of the collet body 4B. Moreover, the size of the attachment 7B and the outer nozzle 8B that configure the adapter kit 20B of the present invention is also changed according to the increase of the diameter of the inner nozzle 6B. Apart from that, the TIG welding torch 1B generally includes the same configurations as those of the TIG welding torch 1A. Therefore, apart from this difference, descriptions of the same portions as the TIG welding torch 1A are omitted and the same reference numerals are given to the same portions in the drawings.

In the TIG welding torch 1B having the above-described structure, while an inert gas such as argon or helium, for example, is discharged from the tip of the inner nozzle 6B as the first shielding gas in which the flow is corrected by the gas lens 17 and mixed gas in which hydrogen is added to argon or mixed gas in which helium is added to argon, for example, is discharged from the tip of the outer nozzle 8B as the second shielding gas in which the flow is corrected by the gas lens 16, an arc is generated between the non-consumable electrode 2 and the material to be welded, and thereby, welding is performed.

In the TIG welding torch 1B having the double nozzle structure, the shielding gas is doubled, and thereby, the weld penetration depth can be deeper. Moreover, in the gas lens type TIG welding torch 1B, the flow of the shielding gas that is discharged from the inner nozzle 6B and the outer nozzle 8B is corrected by the gas lens 17 and 16, and thereby, shielding effects from the atmosphere (air) due to the shielding gas can be enhanced.

In the present invention, by removing the attachment 7B and the outer nozzle 8B that configure the adapter kit 20B of the present invention, the TIG welding torch 1B having the double nozzle structure can be switched to the TIG welding torch having the single nozzle structure. That is, in the TIG welding torch 1B, after the attachment 7B and the outer nozzle 8B that configure the adapter kit 20B of the present invention are removed, the front gasket 106 shown in FIGS.

12A and 12B is disposed between the torch body 5B and the inner nozzle 6B. Thereby, in the TIG welding torch 1B, the double nozzle structure can be easily switched to the single nozzle structure.

Figure 12A:
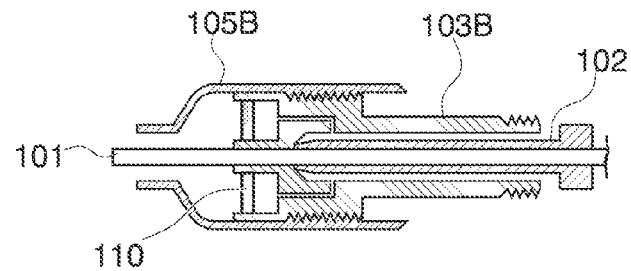
FIG. 12A is a main portion cross-sectional view showing another example of a TIG welding torch of the related art having a single nozzle structure.
Figure 12B:
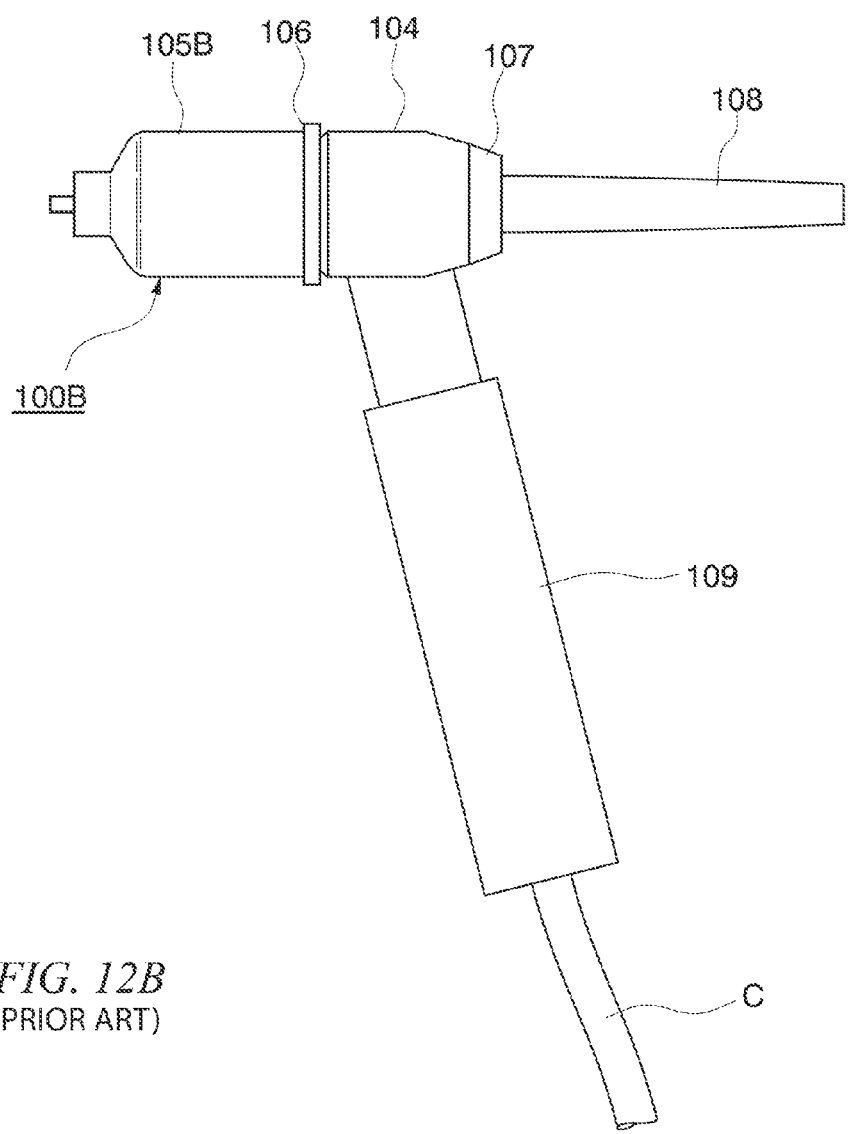
FIG. 12B is an assembly diagram of another example of the TIG welding torch of the related art having the single nozzle structure.
Figure 13:
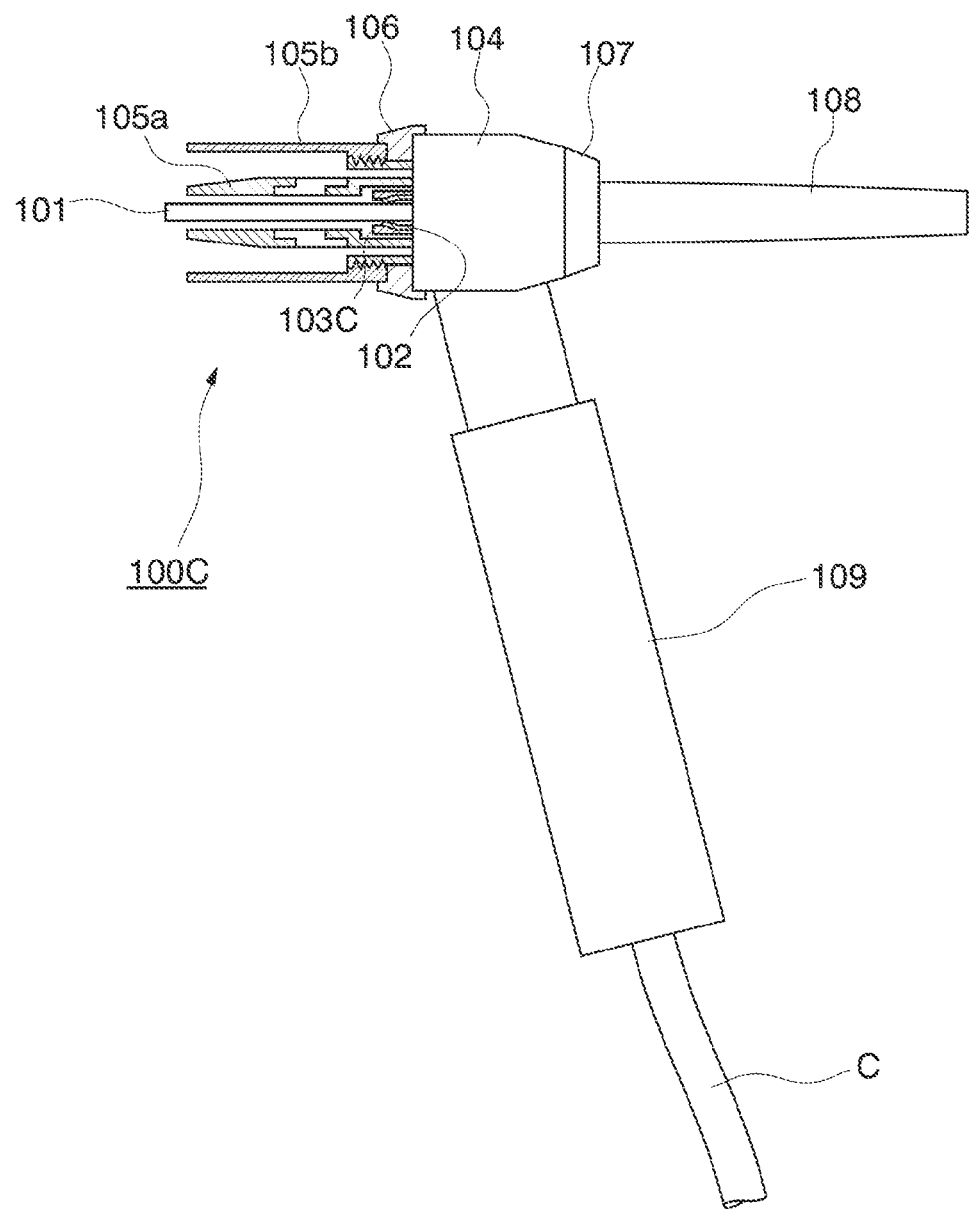
FIG. 13 is an assembly diagram which shows an example of a TIG welding torch of the related having a double nozzle structure and in which the main portion is shown in a cross-section.

Moreover, in the present invention, the adapter kit 20B of the present invention is installed in a switchable manner in the TIG welding torch 100B of the related art having the single nozzle structure shown in FIGS. 12A and 12B, and thereby, the single nozzle structure can be switched to the double nozzle structure. That is, in the TIG welding torch 100B, after the front gasket 106 is removed, the attachment 7B and the outer nozzle 8B that configure the adapter kit 20B of the present invention are mounted. Thereby, in the TIG welding torch 100B, the single nozzle structure can be easily switched to the double nozzle structure.

Figure 4C:
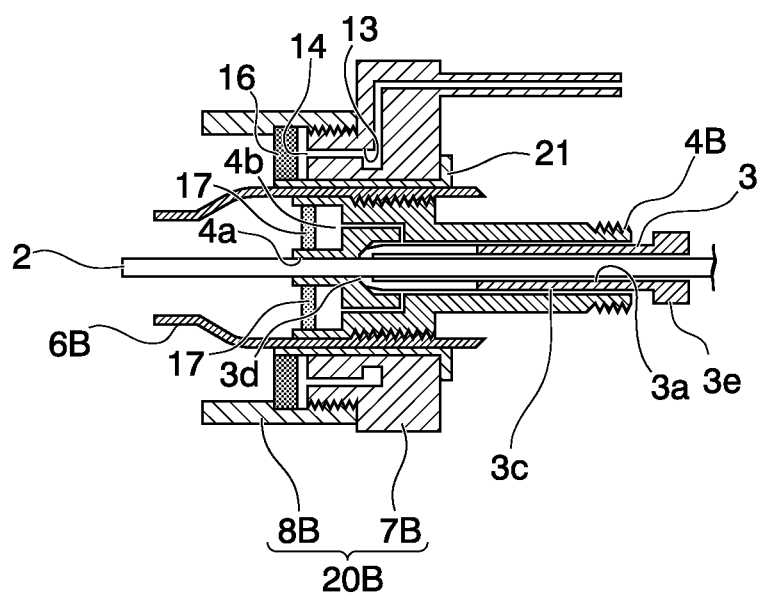
FIG. 4C is a main portion cross-sectional view showing a modification of the TIG welding torch in which the adapter kit shown in FIG. 3 is installed in a switchable manner.

In addition, when the adapter kit 20B of the present invention is installed in a switchable manner in the TIG welding torch 1B, for example, as shown in FIG. 4C, a spacer 21 may be configured so as to be interposed between the attachment 7B and the inner nozzle 6B.

Third Embodiment

Figure 5:
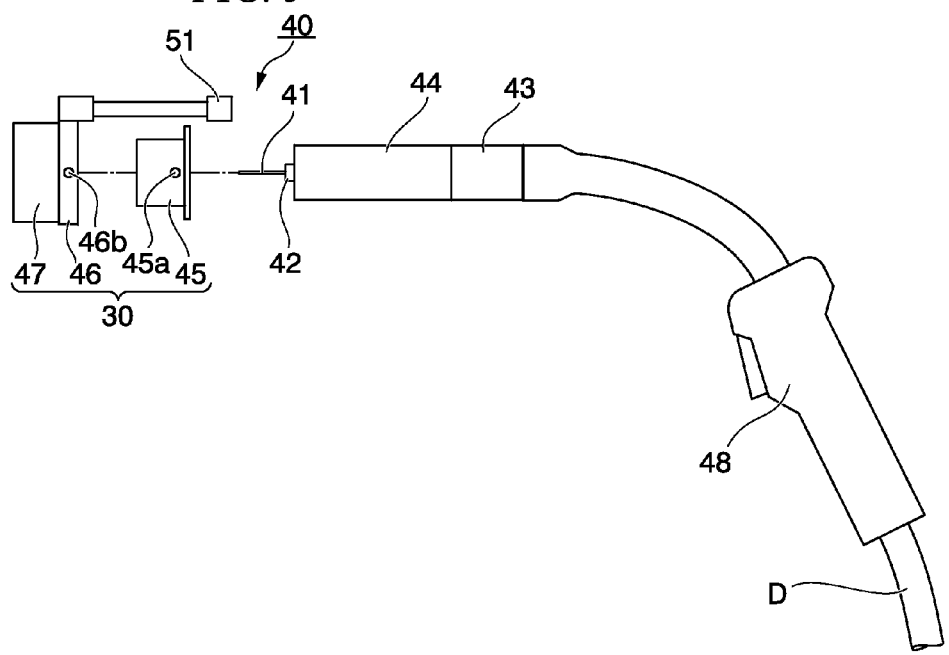
FIG. 5 is an exploded side view showing an example of an MIG welding torch in which the adapter kit of the present invention is installed in a switchable manner.
Figure 6:
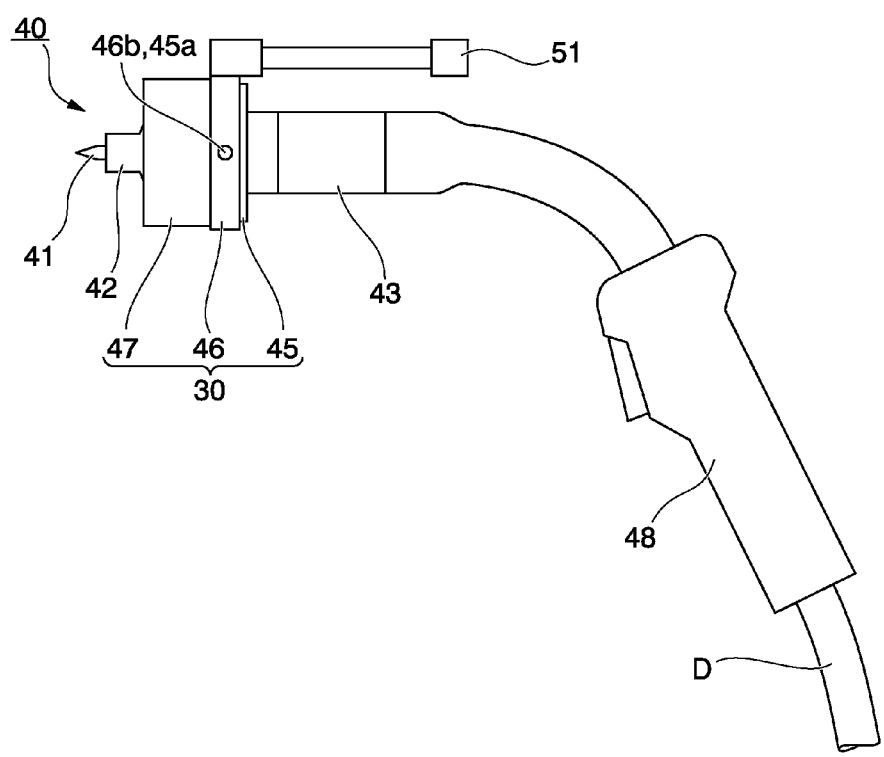
FIG. 6 is an assembly diagram of the MIG welding torch in which the adapter kit shown in FIG. 5 is installed in a switchable manner.
Figure 7:
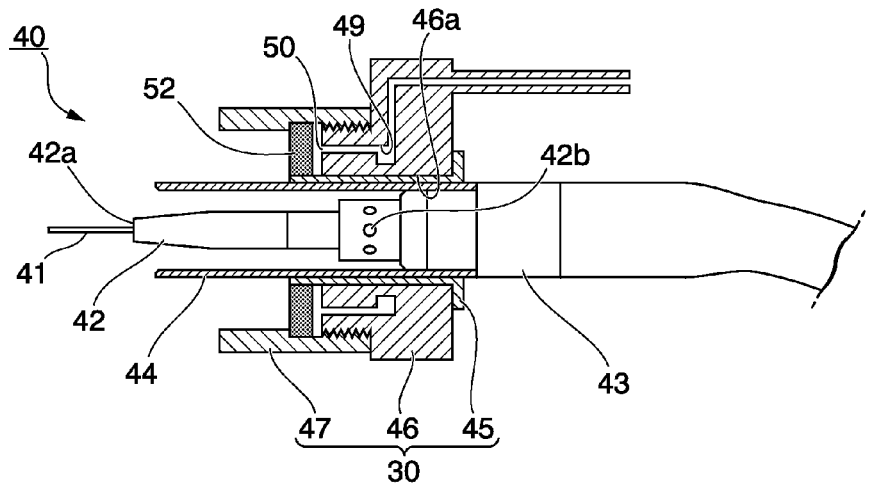
FIG. 7 is a main portion cross-sectional view of the MIG welding torch in which the adapter kit shown in FIG. 5 is installed in a switchable manner.

Next, as a third embodiment, an MIG welding torch 40 in which an adapter kit 30 of the present invention shown in FIGS. 5, 6, and 7 is installed in a switchable manner will be described.

In addition, FIG. 5 is an exploded side view showing the configuration of the MIG welding torch 40, FIG. 6 is an assembly diagram of the MIG welding torch 40, and FIG. 7 is a main portion cross-sectional view of the MIG welding torch 40.

The MIG welding torch 40 is an MIG welding torch in which the double nozzle structure can be switched to the single nozzle structure. In other words, the MIG welding torch 40 is an MIG welding torch in which the adapter kit 30 of the present invention is installed in a switchable manner in the MIG welding torch 200 of the related art shown in FIG. 14, and thereby, the single nozzle structure is switched to the double nozzle structure.

Specifically, as shown in FIGS. 5, 6, and 7, the MIG welding torch 40 generally includes a consumable electrode 41 that generates an arc toward a material to be welded, a contact tip 42 that guides and concurrently sends out the consumable electrode 41 from the tip side of contact tip, a torch body 43 to which the contact tip 42 is mounted, an inner nozzle 44 that is mounted to the torch body 43 surrounding the periphery of the contact tip 42 and discharges a first shielding gas, an attachment 46 that is mounted to the torch body in a state where the inner nozzle 44 is inserted into the inside of the attachment and a spacer 45 is disposed between the attachment and the inner nozzle 44, an outer nozzle 47 that is mounted to the attachment 46 surrounding the periphery of the inner nozzle 44 and discharges second shielding gas, and a handle 48 that is mounted to the torch body 43.

For example, the consumable electrode 41 is configured of a welding wire, and welding wire is consumed while being melted in the arc. Thereby, the MIG welding torch 40 includes a supply device (not shown) for automatically feeding welding wire (consumable electrode 41). Moreover, a material of the consumable electrode 41 may be appropriately selected from those which are configured of a suitable welding material among those known in the related art which are matched to a base material of the material to be welded and may be used.

For example, the contact tip 42 is configured of a substantially cylindrical member that is formed using a metal material having improved electrical conductivity and thermal conductivity such as copper or copper alloy. The contact tip 42 includes a through-hole 42a that penetrates in the axial line direction and can send out the consumable electrode 41 to the tip side of the contact tip through the through-hole 42a. In addition, a flow channel in which the first shielding gas supplied from the torch body 43 flows is formed in the through-hole 42a of the contact tip 42. Moreover, a plurality of ejection holes 42b in which the first shielding gas is ejected are provided at the contact tip 42 so as to be arranged in the circumferential direction. In addition, the base end side of the contact tip 42 can be detachably mounted to the torch body 43 through screwing.

The torch body 43 includes a main body metal fitting (not shown) having a substantially cylindrical shape that is formed using a conductive metal material having lower thermal conductivity than the above-described contact tip 42, for example, a steel material such as mild steel or stainless steel, brass, or the like, and the main body metal fitting has a structure that is coated by an insulating resin.

The main body metal fitting forms a power supply portion that supplies electric power to the consumable electrode 41 via the contact tip 42, and a supply path which feeds the consumable electrode 41 toward the contact tip 42 is formed inside the metal fitting. In addition, a flow channel which supplies the first shielding gas toward the contact tip 42 is formed inside the metal fitting. Moreover, the contact tip 42 can be detachably mounted to one end side (tip side) of the main body metal fitting through screwing.

The inner nozzle 44 performs correction of the flow of the first shielding gas that is ejected from the ejection hole 42b of the contact tip 42, prevents mixture of spatter that is scattered during welding, and has a nozzle shape in which a substantially cylindrical shape is formed using a metal material or the like having improved heat resistance. Moreover, the inner nozzle 44 can be detachably mounted to the outer circumferential portion of the torch body 43 through screwing.

The spacer 45 is inserted into a gap that is formed between the attachment 46 and the torch 43 when the attachment 46 is mounted on the outer circumferential portion of the torch body 43, and the entirety of the spacer is formed in a cylindrical shape using an insulating material having insulating properties, a metal material, or the like, and a flange portion is provided over the entire circumference of the base end side of the spacer. Moreover, a plurality of screw holes 45a (for example, three screw holes) for mounting the attachment 46 to the outer circumferential portion of the torch body 43 are provided so as to be arranged in the circumferential direction of the spacer 45.

For example, the attachment 46 is configured of a member that is formed in a substantially cylindrical shape using a resin material having insulating properties, a metal material, or the like. The attachment 46 includes a through hole 46a that penetrates the center portion of the attachment in the axis line direction and a plurality of screw holes 46b (for example, three screw holes) that are arranged in the circumferential direction in the outer circumferential portion of the attachment. Moreover, in a state where the spacer 45 is inserted from the base end sides of the through-holes 46a and each of the screw holes 46b coincides with each of the screw holes 45a of the screw 45, tip portions of screws (not shown) that are screwed into these screw holes 46b and 45a abut the outer circumferential portion of the torch body 43, and thereby, the attachment 46 can be detachably mounted to the outer circumferential portion of the torch body 43

Moreover, the attachment 46 includes a flow channel 49 that supplies a second shielding gas, a plurality of ejection holes 50 that eject the second shielding gas, and a connection portion 51 to which a hose (not shown) introducing the second shielding gas is connected. Among these, the flow channel 49 is formed in a ring shape so as to surround the periphery of the through-hole 46a in the inner portion of the attachment 46. On the other hand, the plurality of ejection holes 50 are provided so as to be arranged at regular intervals in a position in which the periphery of the through-hole 46a of the front surface side of the attachment 46 is surrounded. Moreover, each of the ejection holes 50 extends in the axis line direction from the front surface side of the attachment 46 and communicates with the flow channel 49. On the other hand, the connection portion 51 is provided on the outer circumferential portion of the attachment 46 and communicates with the flow channel 49. Moreover, for example, a flow rate regulating type one-touch coupler is mounted on the connection portion 51 in order to easily perform the connection of the hose.

The outer nozzle 47 performs correction of the flow of the second shielding gas that is ejected from the ejection holes 50 of the attachment 46 and prevents mixture of spatter that is scattered during welding. In addition, since the outer nozzle is not much subjected to influence of heat as the inner nozzle 44, for example, the outer nozzle is formed in a substantially cylindrical shape using a metal material or the like such as stainless steel. Moreover, the outer nozzle 47 can be detachably mounted to the outer circumferential portion of the attachment 46 through screwing.

In addition, a gas lens 52 that corrects the flow of the second shielding gas discharged from the outer nozzle 47 is disposed between the inner nozzle 44 and the outer nozzle 47. The gas lens 52 is configured of a mesh member made of a metal, is formed in a ring shape, and is held inside the outer nozzle 47 in a state where the inner nozzle 44 is inserted into the gas lens. Moreover, the gas lens 52 is not necessarily needed and may be omitted depending on circumstances.

The handle 48 is a portion that is grasped by a user and can be detachably mounted to the connection portion that is provided on the other end side (rear end side) of the torch body 43. Moreover, the welding cable D can be connected to the connection portion of the torch body 43 by screwing or the like through the inside of the handle 48.

The welding cable D is configured by integrating a power supply cable that supplies electric power from the external power source to the main body metal fitting (power supply portion) of the torch body 43 and a liner that introduces the first shielding gas to the main body metal fitting (flow channel) and feeds the consumable electrode 41 to the main body metal fitting (supply path).

In the MIG welding torch 40 having the above-described structure, while three kinds mixed gas in which helium and carbonic acid is added to argon, for example, is discharged from the tip of the inner nozzle 44 as the first shielding gas, and argon, for example, is discharged from the tip of the outer nozzle 47 as the second shielding gas in which the flow is corrected by the gas lens 52, an arc is generated between the non-consumable electrode 41 and the material to be welded, and thereby, welding is performed while the consumable electrode 41 is melted in the arc.

In the MIG welding torch 40 having the double nozzle structure, the shielding gas is doubled, thereby, consumption of the helium which is more expensive than the argon can be decreased and the weld penetration depth can be deeper. Moreover, in the MIG welding torch 40, the flow of the shielding gas that is discharged from the outer nozzle 47 is corrected by the gas lens 52, and thereby, shielding effects from the atmosphere (air) due to the shielding gas can be enhanced.

In addition, for example, when mixed gas of the argon and hydrogen is used as the second shielding gas, oxidation of a welding bead can be decreased due to reduction of the hydrogen.

In the present invention, by removing the attachment 46, the outer nozzle 47, and the spacer 45 that configure the adapter kit 30 of the present invention, the MIG welding torch 40 having the double nozzle structure can be switched to the MIG welding torch having the single nozzle structure. That is, in the MIG welding torch 40, the attachment 46, the outer nozzle 47, and the spacer 45 that configures the adapter kit 30 of the present invention are removed. Thereby, in the MIG welding torch 40, the double nozzle structure can be easily switched to the single nozzle structure.

Figure 14:
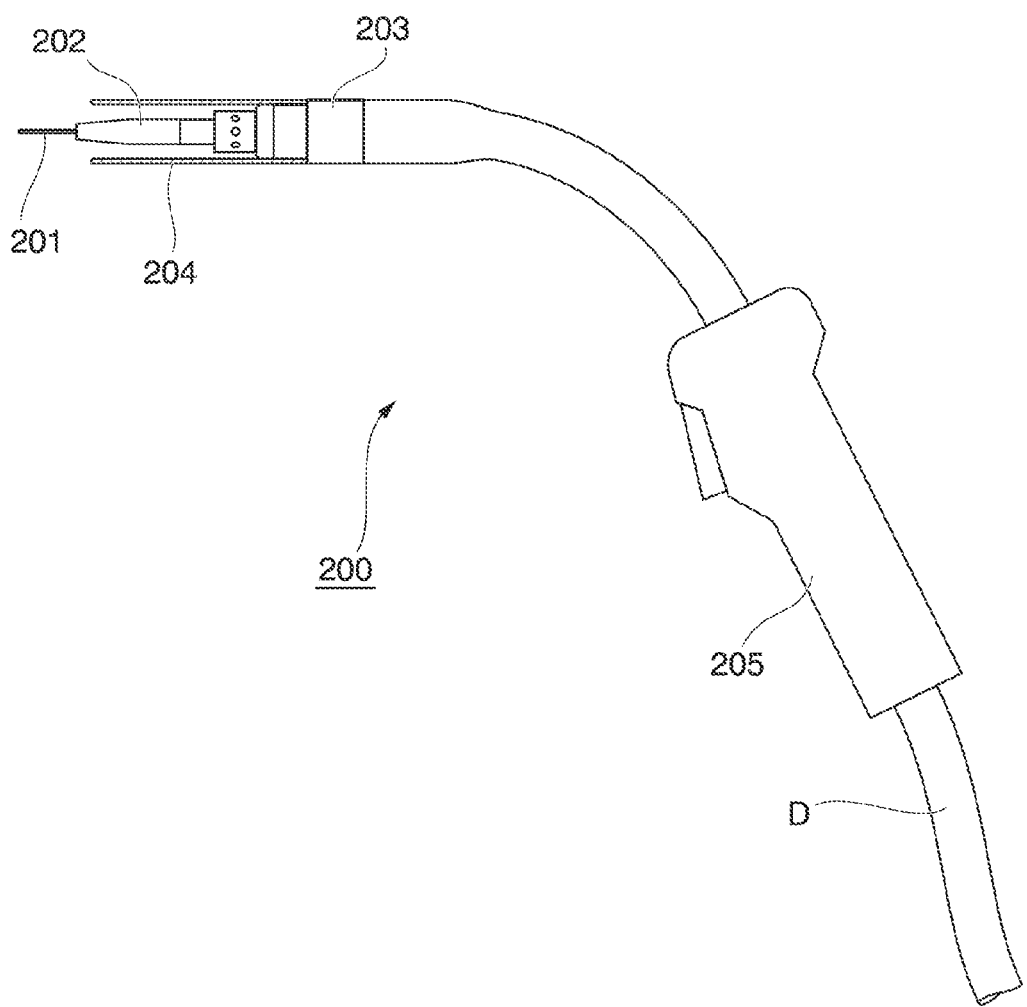
FIG. 14 is an assembly diagram which shows an example of an MIG welding torch of the related art having a single nozzle structure and in which the main portion is shown in a cross-section.

Moreover, in the present invention, the adapter kit 30 of the present invention is installed in a switchable manner in the MIG welding torch 200 of the related art having the single nozzle structure shown in FIG. 14, and thereby, the single nozzle structure can be switched to the double nozzle structure. That is, in the MIG welding torch 200, the attachment 46, the outer nozzle 47, and the spacer 45 that configure the adapter kit 30 of the present invention are mounted. Thereby, in the MIG welding torch 200, the single nozzle structure can be easily switched to the double nozzle structure.

As described above, according to the present invention, the TIG welding torches 1A and 1B, and the MIG welding torch 40 in which the double nozzle structure can be easily switched to the single nozzle structure, and the adapter kits 20A, 20B, and 30 which can easily switch the TIG torches 100A and 100B and the MIG welding torch 200 having the single nozzle structure to those having the double nozzle structure can be supplied at a low cost.

Moreover, in the present invention, the adapter kits 20A, 20B, and 30 can be used in both the TIG welding torches 1A and 1B and the MIG welding torch 40. That is, the adapter kits 20A and 20B which are installed in a switchable manner in the TIG welding torch 1A and 1B have substantially the same configuration as the adapter kit which is installed in a switchable manner in the MIG welding torch 40. On the other hand, when the adapter kits 20A, 20B, and 30 can be used in both the TIG welding torches 1A and 1B and the MIG welding torch 40, the spacers 21 and 45 are disposed so as to match the differences of the outer diameters, and these are integrated through screwing or the like and can be used.

Similarly, the diameters of the existing TIG welding torch, the MIG welding torch, and the like may be different from one another. Therefore, also in the case where the adapter kits 20A, 20B, and 30 are installed in a switchable manner in the existing welding torch is the spacers 21 and 45 in which the outer diameters are matched are disposed, and the adapter kits 20A, 20B, and 30 can be used in both the welding torches having the outer diameters different from each other.

In addition, the present invention is necessarily not limited to the first to third embodiments and various modifications may be applied within the scope which does not depart from the gist of the present invention.

Figure 8A:
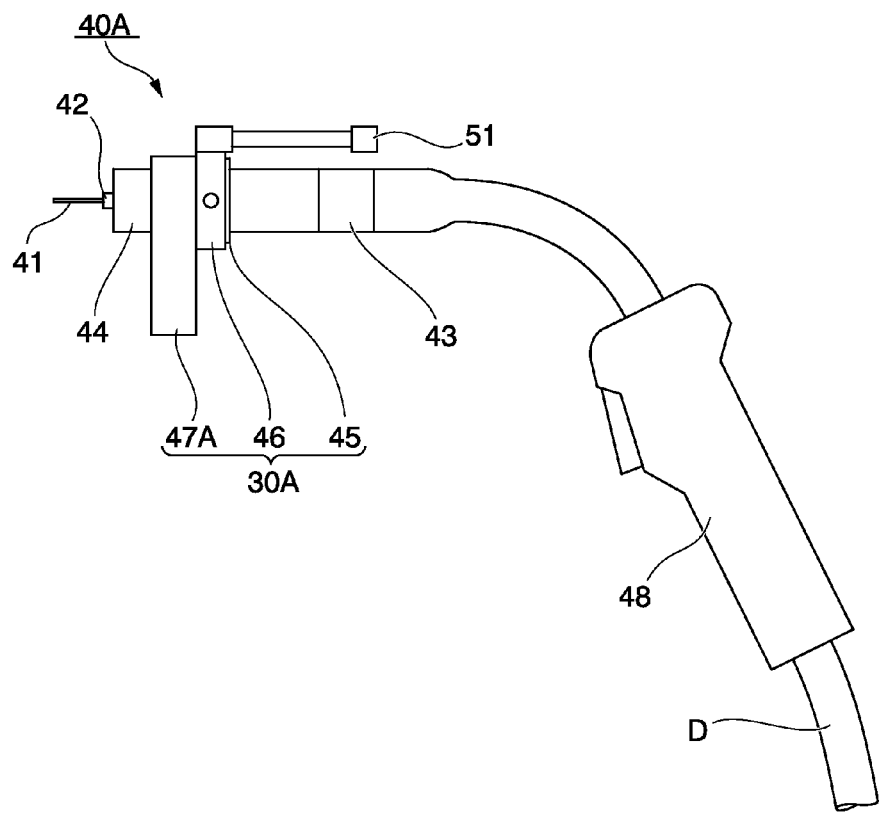
FIG. 8A is an assembly diagram showing another example of the MIG welding torch in which the adapter kit of the present invention is installed in a switchable manner.
Figure 8B:
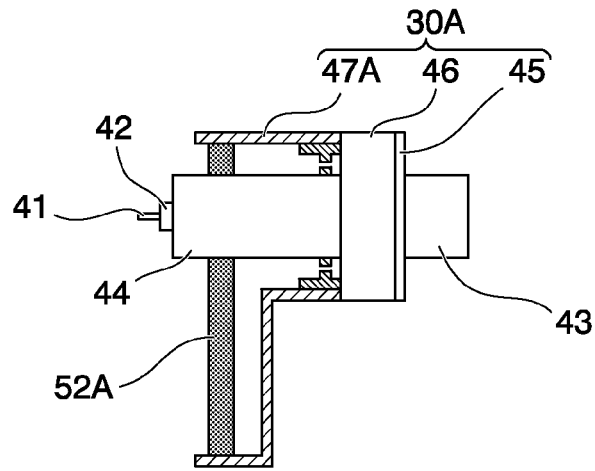
FIG. 8B is a main portion cross-sectional view showing another example of the MIG welding torch in which the adapter kit of the present invention is installed in a switchable manner.
Figure 8C:
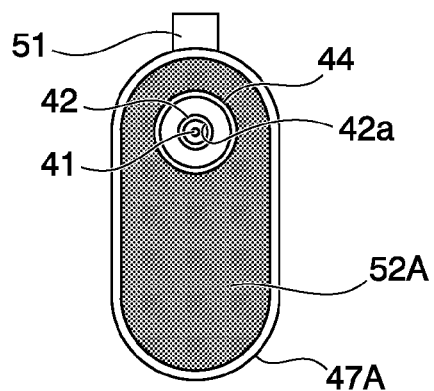
FIG. 8C is a main portion plan view showing still another example of the MIG welding torch in which the adapter kit of the present invention is installed in a switchable manner.

Specifically, in the present invention, for example, an MIG welding torch 40A in which the adapter kit 30A shown in FIGS. 8A, 8B, and 8C are installed in a switchable manner may be configured.

The MIG welding torch 40A includes configurations similar to those of the MIG welding torch 40 in which the adapter kit 30 is installed in a switchable manner except that the outer nozzle 47A configuring the adapter kit 30A has an after-shield structure that surrounds the periphery of a welding bead after welding. Therefore, apart from this difference, descriptions of the same portions as the MIG welding torch 40 are omitted and the same reference numerals are given to the same portions in the drawings.

Specifically, as shown in FIGS. 8A, 8B, and 8C, the outer nozzle 47A is mounted on the outer circumferential portion of the attachment 46 instead of the outer nozzle 47, and is formed in a substantially elliptical cylinder shape from the position at which the periphery of the inner nozzle 44 is surrounded up to the position at which the periphery of welding bead is enclosed toward the rear side in welding line direction.

In addition, a gas lens 52A that corrects the flow of the second shielding gas discharged from the outer nozzle 47 is disposed between the outer nozzle 47A and the inner nozzle 44. Moreover, the gas lens 52A is held inside the outer nozzle 47A in a state where the inner nozzle 44 is inserted into the gas lens. In addition, the gas lens 52A is not necessarily needed and may be omitted depending on circumstances.

In the MIG welding torch 40A having the above-described structure, welding can be performed while welding bead that is formed just after welding and the periphery are shield from the atmosphere (air) due to the second shielding gas discharged from the outer nozzle 47A.

Figure 9:
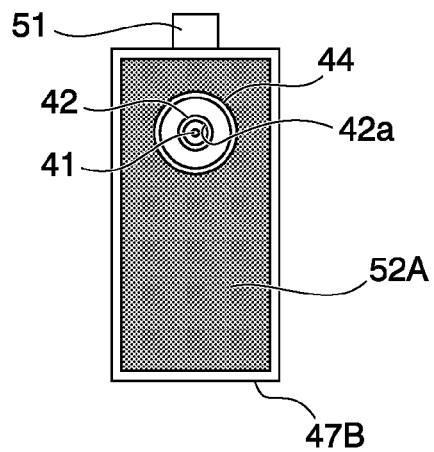
FIG. 9 is a main portion plan view showing a modification of the adapter kit of the present invention.

Moreover, the shape of the outer nozzle 47A having the after-shield structure is not limited to the shape shown in FIG. 8C. For example, like an outer nozzle 47B shown in FIG. 9, the outer nozzle may be formed in a substantially rectangular shape from the position at which the periphery of the inner nozzle 44 is surrounded up to the position at which the periphery of welding bead is surrounded toward the rear side in welding line direction.

Figure 10A:
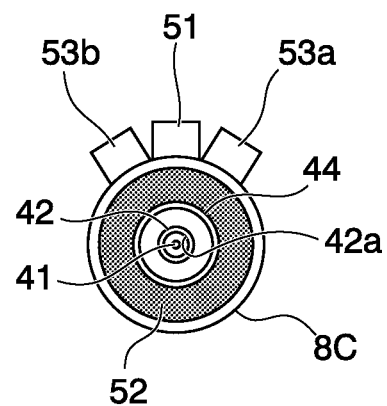
FIG. 10A is a main portion plan view showing a modification of the adapter kit shown in FIGS. 8A to 8C.
Figure 10B:
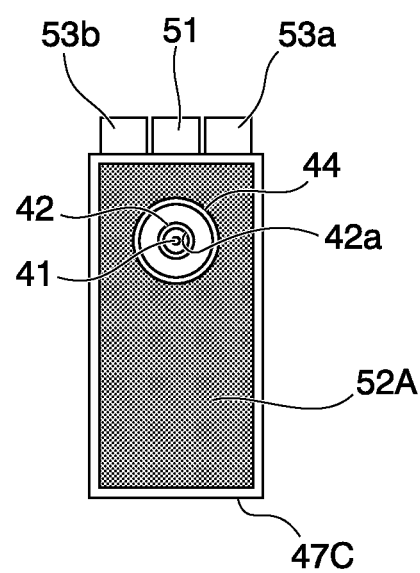
FIG. 10B is a main portion plan view showing a modification of the adapter kit shown in FIG. 9.

In addition, all the TIG welding torch 1A and 1B and the MIG welding torches 40 and 40A are configured so as to include air-cooled outer nozzles 8A, 8B, 47, and 47A. However, the present invention is not limited to the air-cooled type. For example, the torches may be configured so as to include water-cooled outer nozzles 8C and 47C as shown in FIGS. 10A and 10B.

Specifically, the outer nozzles 8C and 47C include a supply port 53a that supplies a cooling liquid (water) and an outlet 53b that discharges the cooling liquid (water). Moreover, the cooling liquid (water) flows in the inner portions of the outer nozzles 8C and 47C between the supply port 53a and the outlet 53b, and thereby, the outer nozzles 8C and 47C can be forcibly cooled (water-cooled).

In addition, the outer nozzles 8A, 8B, 8C, 47, 47A, 47B, and 47C are not necessarily limited to the above-described shape (for example, the size of the diameter or the like). Moreover, the outer nozzle may not be limited to a homemade those, and a commercial outer nozzles may be used. Thereby, the outer nozzles 8A, 8B, 8C, 47, 47A, 47B, and 47C can be easily provided at a low cost.

Moreover, in the TIG welding torch 1A and 1B, and the MIG welding torch 40, a holding tool such as a band for fixing the hose that introduces the second shielding gas may be mounted to the torch bodies 5 and 43. In addition, the connection portions 15 and 51 of the attachments 7A, 7B, and 46 shown in FIGS. 2A, 2B, 4A, 4B, and 5 are configured so as to be position above the attachments 7A, 7B, and 46. However, the present invention is not necessarily limited to this configuration, and the connection portions may be disposed below the attachments 7A, 7B, and 46, and the like.

Moreover, the MIG welding torches 40 and 200 may be a MAG welding torch which uses a shield gas in which carbonic acid gas is added to the above-described inert gas.

In addition, when the MAG welding torch is used, the mixed gas of the argon and carbonic acid is used as the first shielding gas, thereby, consumption of the mixed gas is decreased, and as a result, the consumption of the argon which is much expensive than the carbonic acid can be decreased. Moreover, similar to a case where a general MAG welding torch having single nozzle structure is used, decrees effects of the spatter can be obtained.

INDUSTRIAL APPLICABILITY

Moreover, the present invention is not limited to the above-described handle type welding torch and the present invention may be applied to a pencil type welding torch. In addition, the present invention is not limited to the air-cooled type or the water-cooled type, and the present invention may be widely applied to the welding torches such as a manual type or a (semi) automatic type welding torch to which the present invention can be applied.

REFERENCE SIGNS LIST 1A and 1B: TIG welding torch
2: electrode
3: collet
4: collet body
5: torch body
6A and 6B: inner nozzle
7A and 7B: attachment
8A, 8B, and 8C: outer nozzle
9: rear gasket
10: torch cap
11: handle
16 and 17: gas lens
20A and 20B: adapter kit
21: spacer
30 and 30A: adapter kit
40: MIG welding torch
41: consumable electrode
42: contact tip
43: torch body
44: inner nozzle
45: spacer
46: attachment
47, 47A, and 47B: outer nozzle
48: handle
52: gas lens

The invention claimed is:
1. A welding torch comprising:
a non-consumable electrode that generates an arc toward a material to be welded;
a collet that supports the non-consumable electrode which is being inserted into the inside of the collet;
a collet body that internally holds the collet in a state where the non-consumable electrode protrudes from a tip side of the collet body;
a torch body that mounts the collet body and comprises a power supply portion that supplies electric power to the non-consumable electrode via the collet body and the collet, and a first flow channel that supplies a first shielding gas;
an inner nozzle that is mounted to the collet body surrounding the periphery of the non-consumable electrode and discharges the first shielding gas, the inner nozzle being mounted on an outer circumferential portion of the collet body;

an attachment that is removably mounted to the torch body in a state where the inner nozzle is inserted into an inside of the attachment, and comprises a second flow channel that supplies a second shielding gas; and an outer nozzle that is mounted to the attachment surrounding the periphery of the inner nozzle and discharges the second shielding gas, wherein the attachment is removably mounted by being interposed between the torch body and the inner nozzle; and the collet body has a flow channel through which the first shielding gas supplied from the torch body flows.

2. The welding torch according to claim 1, wherein the attachment is removably mounted to the torch body in such a way that the attachment and the outer nozzle can be removed from the torch body to thereby convert the welding torch from a double nozzle structure to a single nozzle structure.

3. The welding torch according to claim 1, further comprising a torch cap that is positioned on a first side of the torch body that is opposite to a second side of the torch body on which the collet body is mounted, and that fixes the non-consumable electrode, wherein the torch cap is mounted with a gasket which is disposed between the torch cap and the torch body.

4. The welding torch according to claim 1, further comprising, a handle that is mounted to the torch body, and a welding cable which integrates a power supply cable that supplies electric power to the power supply portion and a hose that introduces the first shielding gas to the first flow channel, wherein the welding cable passes through an inside of the handle and is connected to a connection portion that is provided in the torch body.

5. The welding torch according to claim 1, wherein a connection portion which connects to a hose that introduces the second shielding gas is provided in the attachment.

6. The welding torch according to claim 1, further comprising, a gas lens that is disposed between the inner nozzle and the outer nozzle and corrects the flow of the second shielding gas that is discharged from the outer nozzle.

7. The welding torch according to claim 1, wherein the collet body is formed so as to integrate with a gas lens that corrects the flow of the first shielding gas that is discharged from the inner nozzle.

8. The welding torch according to claim 1, wherein the outer nozzle is shaped such that it forms an after-shield structure that delivers the second shielding gas to portions of a welding bead that has just been formed by the welding torch as the welding torch moves along a welding line direction.

9. The welding torch according to claim 1, wherein the attachment is removably mounted only by being interposed between the torch body and the inner nozzle.

10. The welding torch according to claim 1, wherein the attachment has a through-hole that penetrates in a direction into which a non-consumable electrode is inserted, and wherein the second flow channel is formed in a ring shape so as to surround a periphery of the through-hole in an inner portion of the attachment.

11. The welding torch according to claim 8, wherein the outer nozzle has one of an elliptical cylindrical shape and a rectangular shape.

* * * * *